United States Patent
S et al.

(10) Patent No.: US 12,461,657 B2
(45) Date of Patent: Nov. 4, 2025

(54) USING A ZONE WORDLINE TABLE TO INITIATE A FIND LAST GOOD PAGE PROCESS

(71) Applicant: Sandisk Technologies, Inc., Milpitas, CA (US)

(72) Inventors: Gopu S, Kottarakkara (IN); Binoy Jose Panakkal, Ernakulam (IN); Subin CP, Kozhikode (IN); Pawan Kumar Negi, Bangalore (IN); Bhavadip Solanki, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 59 days.

(21) Appl. No.: 18/436,408

(22) Filed: Feb. 8, 2024

(65) Prior Publication Data
US 2025/0258611 A1  Aug. 14, 2025

(51) Int. Cl.
*G06F 3/06* (2006.01)
*G06F 11/00* (2006.01)

(52) U.S. Cl.
CPC ......... *G06F 3/0617* (2013.01); *G06F 3/0629* (2013.01); *G06F 3/0653* (2013.01); *G06F 3/0679* (2013.01); *G06F 11/00* (2013.01); *G06F 2211/1071* (2013.01)

(58) Field of Classification Search
CPC .... G06F 3/0617; G06F 3/0629; G06F 3/0653; G06F 3/0679; G06F 11/00; G06F 2211/1071
See application file for complete search history.

(56) References Cited

U.S. PATENT DOCUMENTS

| | | | |
|---|---|---|---|
| 2019/0371385 A1* | 12/2019 | Nagata | G11C 11/2253 |
| 2023/0393991 A1* | 12/2023 | Chang | G11C 29/028 |
| 2024/0152423 A1* | 5/2024 | Swami | G06F 11/1068 |

* cited by examiner

*Primary Examiner* — Sean D Rossiter
(74) *Attorney, Agent, or Firm* — DENTONS Durham Jones Pinegar (57) ABSTRACT

A memory device includes a wordline zone table that stores information about how wordlines of one or more memory blocks are divided into wordline zones. The wordline zone table also stores a value associated with each wordline zone. When the memory device receives a command, a controller identifies a wordline associated with the command. The controller uses the wordline zone table to determine the wordline zone, and the value, associated with the wordline. The value is stored in a non-data wordline. When a find last good page (FLGP) process is initiated in response to an ungraceful device shutdown (UGDS) event, the controller determines the value stored in the non-data wordline. The controller compares the value in the non-data wordline to the values in the wordline zone table to determine which wordline zone matches the value. The FLPG process is applied to the wordline zone having the matching value.

20 Claims, 7 Drawing Sheets

| WORDLINE ZONE | WORDLINES | READ LEVEL | DMC VALUE | VPGM |
|---|---|---|---|---|
| 1 | WL0-WL26 | 2V | 0 | 10V |
| 2 | WL27-WL54 | 2V | 2000 | 11V |
| 3 | WL55-WL84 | 2V | 4000 | 12V |
| 4 | WL85-WL118 | 2V | 6000 | 13V |
| 5 | WL119-WL140 | 2V | 8000 | 14V |
| 6 | WL141-WL168 | 2V | 10000 | 15V |
| 7 | WL169-WL196 | 2V | 12000 | 16V |
| 8 | WL197-WL217 | 2V | 14000 | 17V |

USING A ZONE WORDLINE TABLE TO INITIATE A FIND LAST GOOD PAGE PROCESS

BACKGROUND

Programming operations of a memory device are interrupted when the memory device is shutdown. However, the impact of the shutdown differs depending on how the memory device is shutdown. For example, if the memory device is shutdown gracefully, the memory device is given time to complete any pending operations and close some, or all, open memory blocks. In some situations, memory blocks remain open, but the system stores a last good page (LGP) indicator that represents where a partially completed programming operation was stopped. The memory device uses the stored LGP to identify where to continue programming operations when the memory device is restarted. As such, the memory device can complete the programming operations and close the open memory block when it is full.

However, when an ungraceful device shutdown (UGSD) occurs, the memory device is not given time to complete any pending operations. Such situations may leave open memory blocks, or dirty blocks. Typically, the memory device does not have a LGP associated with dirty blocks. When power is restored to the memory device, the controller is configured to find a last good page of each dirty block, namely a last page of the memory block that was successfully programmed by the controller prior to the interruption.

To locate the dirty blocks, the memory device typically performs a linear search or a binary search across all of the memory blocks. As part of the search, the memory device examines all of the wordlines to identify the most recently written wordline, or the most recently written page associated with the wordline, within the memory block.

Such "find last good page" ("FLGP") processing requires computational overhead and data transfer operations internal to the memory device while the memory device is restarting. FLGP processing adds time to the startup process, delaying the memory device from being available to field new operations. Accordingly, it would be beneficial to reduce the computational complexity and processing time of FLGP processing.

SUMMARY

The present disclosure describes using non-data wordlines, or dummy wordlines, of a memory block to store information associated with a last good page (LGP) of the memory block. As will be explained herein, wordlines of the memory block are divided into two or more wordline zones. A value is associated with each wordline zone. In an example, the value is a data mis-compare value and is associated with a particular program voltage. For example, a first value is associated with a first program voltage, a second value is associated with a second program voltage and so on.

When a memory device receives a program operation (e.g., a write command) from a host device, a controller and/or firmware of the memory device identifies a particular wordline (or a wordline number) associated with the program operation. The controller and/or firmware determines a wordline zone associated with the wordline and/or whether the wordline is a boundary wordline (e.g., a last wordline or a first wordline) of the wordline zone. If the wordline is the boundary wordline of the wordline zone, the value associated with the wordline zone is programmed/stored in the non-data wordline.

In an example, storing the value associated with the wordline zone in the non-data wordline indicates that all of the wordlines (or all of the pages associated with the wordlines) in the wordline zone have been programmed. In another example, storing the value associated with the wordline zone in the non-data wordline indicates that not all of the wordlines (or not all of the pages associated with all of the wordlines) in the wordline zone have been programmed.

When a find last good page (FLGP) process is initiated (e.g., in response to an occurrence an ungraceful device shutdown (UGDS) event), the controller determines the value stored in the non-data wordline. The controller compares the value in the non-data wordline to values in a wordline zone table. In an example, different values in the wordline zone table correspond to different wordline zones. When matching values are identified, the FLGP process is initiated on a particular wordline zone. For example, the FLGP process is initiated on the wordline zone that is associated with a value that matches the value stored in the non-data wordline.

Using these operations, the time it takes to complete the FLGP process is significantly reduced when compared with current solutions. For example, a FLGP process using a linear search can require up to X number of reads, where X is the number of wordlines of the memory block. Similarly, a FLGP process using a binary search can require up to log (X) number of reads. However, using the various techniques and operations described herein, the FLGP process may require a maximum number of log (X/Y) reads to find the last good page, where Y is the number of wordline zones.

Accordingly, examples of the present disclosure describe a method that includes dividing wordlines of a memory block of a memory device into a plurality of wordline zones. In an example, each wordline zone of the plurality of wordline zones is associated with a value. When the memory device receives a command from a host device, a wordline associated with the command is identified. A determination is made regarding whether the wordline associated with the command is a boundary wordline associated with a particular wordline zone. Based, at least in part, on determining the wordline is a boundary wordline associated with the particular wordline zone, the value associated with the particular wordline zone is stored in a non-data wordline.

Other examples describe a memory device that includes a controller and a find last good page (FLGP) system. In an example, the FLGP system is operable to identify a wordline associated with a command received from a host device. The FLGP system also determines whether the wordline associated with the command is in a particular position within a wordline zone. In an example, the wordline zone is associated with a value. The FLGP system also stores the value associated with the wordline zone in a non-data wordline based, at least in part, on determining the wordline associated with the command is in the particular position within the wordline zone.

Another example describes a method that includes detecting an occurrence of an ungraceful device shutdown (UGDS) event. In response to detecting the occurrence of the UGDS, a find last good page (FLGP) process is initiated. In an example, the FLGP process includes determining a value stored in a non-data wordline associated with a memory block of a memory device. In an example, the memory block has a plurality of wordlines and each of the plurality of wordlines are associated with a wordline zone. The method also includes identifying a particular wordline zone associated with the value and applying the FLGP process based, at least in part, on the value.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Semiconductor memory and storage devices are widely used in various electronic devices such as cellular telephones, digital cameras, personal digital assistants, medical devices, mobile computing devices, and non-mobile computing devices. Semiconductor memory may include non-volatile memory or volatile memory. A non-volatile memory allows information to be stored and retained even when the non-volatile memory is not connected to a power source (e.g., a battery). Examples of non-volatile memory include flash memory (e.g., NAND-type and NOR-type flash memory) and Electrically Erasable Programmable Read-Only Memory (EEPROM).

Typically, a memory device includes one or more memory dies. Each of the one or more memory dies includes one or more memory planes, each consisting of a plurality of memory blocks. During programming of the memory device, a controller of the memory device performs programming operations (e.g., read operations, write operations, other suitable operations, or a combination thereof) on pages of a memory block according to commands received by the controller. The memory blocks that the system is currently working with are "open memory blocks" within the system. When the controller completes all operations for an open memory block, the controller stores information in persistent memory indicating that programming of the memory block is complete. This process repeats until programming of the memory device is complete.

During use, various situations may occur that cause the programming operations to be interrupted. In some situations, the memory device is gracefully shutdown. Graceful device shutdown ("GSD") allows the memory device time to complete any pending operations, such as completing any pending write or erase operations, thus closing some or all of the open memory blocks after the memory device is shut down. In some GSD situations, some open memory blocks remain open. However, the system stores a last good page ("LGP") indicator that represents where a partially completed programming operation was stopped (e.g., a particular page of the block). This scenario leaves a "clean" open memory block, as it includes a clear indication of where the operation stopped within that block. In such GSD situations, the memory device can use the stored LGP to identify where to continue any programming operation upon restart from the place the last operation was stopped, thereby allowing the memory device to complete the programming operation and close the open memory block when full.

However, some situations cause the memory device to experience ungraceful device shutdown ("UGSD"). UGSD may be caused by, for example, power disruptions or power fluctuations to one or more systems/components of the memory device. Such situations may leave open memory blocks, or "dirty blocks", that were interrupted during a programming operation, and for which the memory device does not have a LGP. When power is restored to the memory device, the controller may be configured to find a last good page of each dirty block, namely a last page of the memory block that was successfully programmed by the controller prior to the interruption.

The controller may use the information stored in persistent memory to identify the dirty blocks, but without knowing the LGP for that dirty block, the memory device inspects the contents of the pages of each dirty block to find the LGP in that memory block (e.g., to allow the memory device to reprogram the remaining portions of each dirty block). Such "find last good page" ("FLGP") processing requires computational overhead and data transfer operations internal to the memory device during restart of the memory device. This FLGP processing adds time to the startup process, delaying the memory device from being available to field new operations. Accordingly, it would be beneficial to reduce the computational complexity and processing time of this FLGP processing.

To address the above, the present application describes using non-data wordlines, or dummy wordlines, of a memory block to store information associated with a last good page (LGP) of the memory block. In an example, the wordlines of the memory block are divided into two or more wordline zones. A value is associated with each wordline zone. In an example, the value is a data mis-compare value and is associated with a particular program voltage. For example, a first value is associated with a first program voltage, a second value is associated with a second program voltage and so on.

When a memory device receives a program operation (e.g., a write command) from a host device, a controller and/or firmware of the memory device identifies a particular wordline associated with the program operation. The controller and/or firmware determines a wordline zone associated with the wordline and/or whether the wordline is a boundary wordline (e.g., a last wordline or a first wordline) of the wordline zone.

If the wordline is the boundary wordline of the wordline zone, the value associated with the wordline zone is programmed/stored in the non-data wordline. In an example, storing the value associated with the wordline zone in the non-data wordline indicates that all of the wordlines (or all of the pages associated with all of the wordlines) in the wordline zone have been programmed. In another example, storing the value associated with the wordline zone in the non-data wordline indicates that some of the wordlines (or some of the pages associated with the wordlines) have yet to be programmed and/or closed.

When an ungraceful device shutdown (UGDS) event is detected, the controller initiates a find last good page (FLGP) process. As part of this process, the controller determines the value stored in the non-data wordline. The controller compares the value in the non-data wordline to values in a wordline zone table. When matching values are identified, the FLGP process is initiated on a wordline zone that is associated with a matching value.

As previously explained, the time it takes to complete the FLGP process using a wordline zone table and storing values in non-data wordlines is significantly reduced when compared with current solutions. For example, using the various techniques and operations described herein, the FLGP process may require a maximum number of log (X/Y) reads to find the last good page, where X is the number of wordlines of the memory block and Y is the number of wordline zones. In contrast, a FLGP process using a linear search can require up to X number of reads. Similarly, a FLGP process using a binary search can require up to log (X) number of reads.

Accordingly, many technical benefits may be realized including, but not limited to, reducing an amount of time it takes to reboot a memory device after an UGDS event by limiting or reducing the search for dirty blocks to different wordline zones; increasing the robustness of memory devices by enabling critical system data to be stored in non-data wordlines; and programming the non-data wordlines can occur as part of background operations, which do not affect the quality of service provided by the memory device.

These benefits, along with other examples, will be shown and described in greater detail with respect to FIG. 1-FIG. 8.

Figure 1:
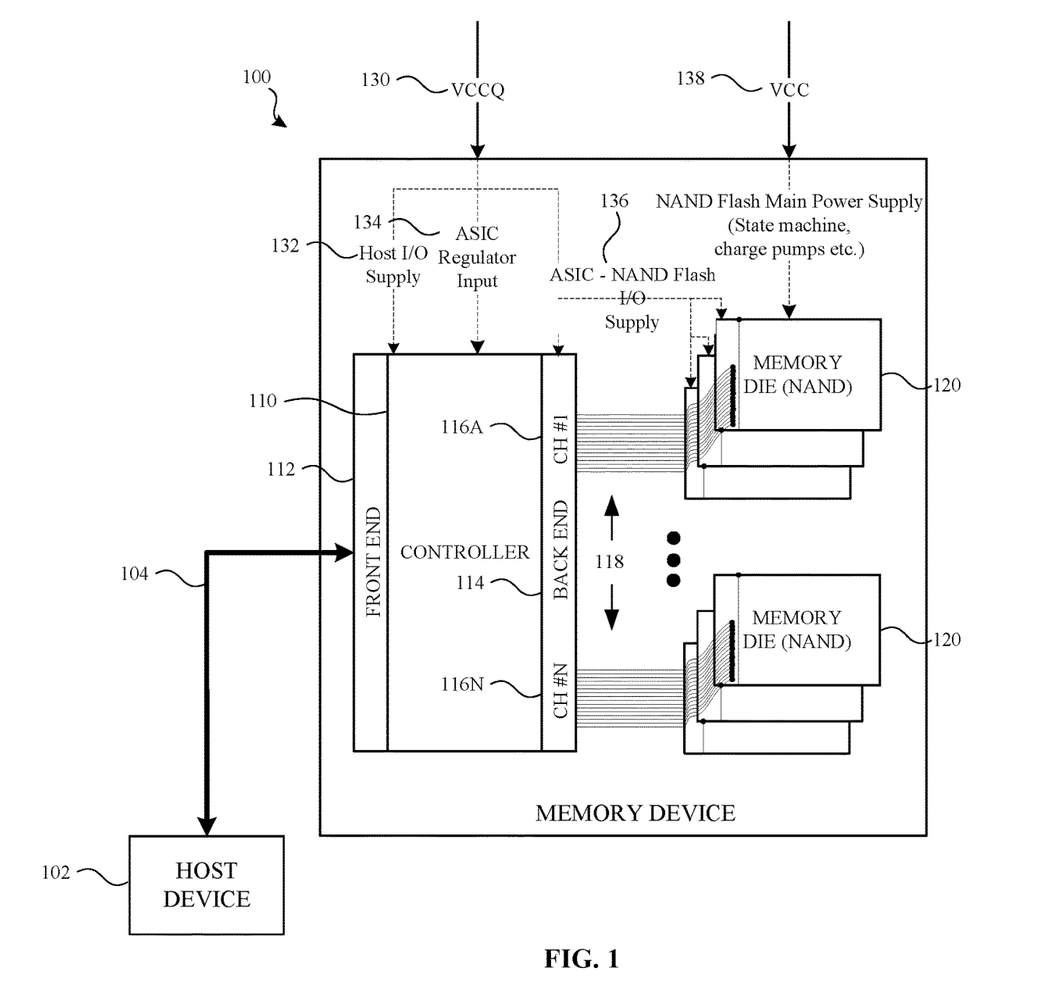
FIG. 1 is a component diagram of a memory device according to an example.

FIG. 1 is a component diagram of a memory device 100 according to an example. In this example, the memory device 100 includes a controller 110 (e.g., an application-specific integrated circuit (ASIC)) and one or more memory dies 120 (e.g., utilizing NAND-type flash memory). The controller 110 manages input/output (I/O) operations between the memory device 100 and a host device 102 (e.g., a computing device such as, for example, a mobile phone, a desktop computer, a server computing device, a removable storage card, or the like). The controller 110 includes a front end module (or just "front end") 112 that is configured to broker various communication operations between the host device 102 and the memory device 100 (e.g., receiving I/O commands from the host device 102, transmitting associated responses, and the like). The controller 110 also includes a back end module (or just "back end") 114 that is configured to communicate with the various memory dies 120 included in the memory device 100.

In this example, the memory dies 120 are non-volatile, NAND-type flash memory devices that store and retrieve data (also referred to herein as "host data" or "user data"). These memory dies 120 may include 2D or 3D (e.g., stacked) NAND non-volatile memory (e.g., as a 2D or 3D array of memory cells) that define a memory structure that is addressable by wordlines using a decoder (e.g., row decoder) and by bit lines. Commands and data are transferred between the host device 102 and the controller 110 using a data bus 104, and between controller 110 and one or more of the memory dies 120 by way of lines 118. In one example, memory die 120 includes a set of input and/or output (I/O) pins that connect to lines 118.

In an example, the memory device 100 is powered by two power input lines, an I/O voltage (or VCCQ) 130 and a core voltage (or VCC) 138. The VCCQ 130 is used to provide a host I/O supply 132, an ASIC regulator input 134, and an ASIC-NAND flash I/O supply 136 to the controller 110. The VCC 138 provides a main power supply to the memory dies 130. In some examples, these inputs 130, 138 are provided by the host device 102, which may, as such, control power to the memory device 100.

In an example, the controller 110 logically organizes the NAND memory (e.g., all of the bits provided by cells of the memory dies 120) into memory blocks of a predetermined size (e.g., 4 megabytes (MBs), 16 MBs, 32 MBs, or the like). Each of these memory blocks includes multiple pages of a predetermined page size (e.g., 16 kilobytes (KBs), 32 KBs, 64 KBs, or the like). In an example, all of the bits/cells for a particular page are all of the cells of a particular wordline. Such cells can be single-level cells (SLCs) (e.g., storing one bit per cell) or multi-level cells (MLCs) (e.g., storing more than one bit per cell).

Typically, NAND flash memory performs an erase command before writing/programming to a particular page and/or memory block. In an example, a page is the smallest area of the memory dies 120 that supports a write operation and is performed on all of the memory cells on a particular wordline, a block is the smallest area of the memory dies 120 that supports an erase operation, and all properly erased bit store a value of '1' (or '0') after the erase.

In an example, the memory block has two-hundred eighteen wordlines. Although two-hundred eighteen wordlines are specifically mentioned, the memory block can have any number of wordlines. In an example, the two-hundred eighteen wordlines are data wordlines. In addition to the data wordlines, the memory block includes non-data wordlines (or dummy wordlines), along with a select gates on a source side and a select gate on a drain side.

As will be explained in greater detail herein, the wordlines are logically divided into a number of different wordline zones. In an example, the number of wordline zones, along with the number of wordlines in each wordline zone, can vary. For example, a first wordline zone and a second wordline zone can include twenty-seven wordlines, a third wordline zone can include thirty wordlines, while a fourth wordline zone can include thirty-three wordlines, and so on.

In an example, each wordline zone is associated with, or includes one or more boundary wordlines. The boundary wordlines define a beginning wordline of the wordline zone and/or an ending wordline of the wordline zone. For example, the beginning wordline of a first wordline zone is Wordline 1 while an ending wordline of the first wordline zone is Wordline 27. Additionally, each wordline zone includes, or is otherwise associated with, a value and a programming voltage (VPGM). In an example, the value is a programmable data mis-compare value that indicates a number of zeros (or ones) in various memory cells of the memory device based, at least in part, on a particular read threshold. The data mis-compare value will be described in greater detail with respect to FIG. 3.

During operation, the memory device 100 receives I/O commands from the host device 102. In an example, the I/O commands include, but are not limited to, read commands (e.g., commands for data already stored on the memory device 100), write commands (also sometimes referred to herein as "program commands" or "programming operations") (e.g., commands to write data to the memory device 100), and erase commands (e.g., commands to erase portions of data currently stored on the memory device 100). The memory device 100, for example the controller 110, responds to each of these commands via subsequent operations conducted on the memory dies 120.

For write operations, the controller 110 and/or the host device 102 maintains and manages an open memory block table that identifies which memory blocks are currently in the midst of a write operation. For example, a particular memory block is entered into the open memory block table when a write operation is initiated on that memory block. Additionally, that memory block is cleared from the open memory block table when that operation is successfully completed. In an example, the open memory block table stores LGP data (e.g., in clean graceful shutdown situations, where the memory device has time to store an LGP for open memory blocks).

During operation, the memory device 100 may receive a shutdown command from the host device 102 (e.g., in the case of a "graceful shutdown"). During such situations, the memory device 100 may be afforded time to finish any unfinished operations (e.g., complete any write operations on all of the open memory blocks or store LGPs for each partially completed operation in an open memory block) before the memory device 100 is shut down.

In other situations, the memory device 100 may experience an event that interrupts the normal operation of the memory device 100 (e.g., a voltage drop on the power inputs 130, 138, or the like). In such "unplanned interruptions", an ungraceful device shutdown (UGDS) may occur. As a result, write operations currently being performed on some or all of the open memory blocks may be in a partially performed (e.g., incomplete, or "dirty" state) or otherwise unknown or uncertain state (e.g., a partially programmed memory block). As such, when power is restored to the memory device 100 and/or the memory device reestablishes normal operation, all of the memory blocks that were open at the time of the interruption are in a dirty state. Accordingly, the memory device 100 is configured to inspect each of these dirty blocks to find a last good page (also referred to herein as an FLGP operation/process) that was performed during the associated programming operation.

When the LGP of a particular dirty block is identified, the memory device 100 can continue completing the interrupted operation (e.g., starting the next valid, uncorrupted page after the LGP and continuing to the end of the memory block). In another example, the memory device 100 is configured to perform any other programming operation starting at that next valid page (e.g., depending on host and firmware configurations, or the like).

Current FLGP solutions use either a linear search or a binary search as part of the FLGP process. The amount of time it takes to complete the FLGP process using a linear search can require up to X number of reads (where X is the number of wordlines in a memory block). Similarly, a FLGP process using a binary search can require up to log (X) number of reads. However, the amount time it takes to complete the FLGP process is significantly reduced using the various techniques and operations described herein. For example, the FLGP process may require a maximum number of log (X/Y) reads to find the last good page (where Y is the number of wordline zones).

For example, after the wordlines have been divided into wordline zones and each wordline zone is associated with a value and/or a program voltage, this information is stored in a wordline zone table. When a command or a program operation (e.g., a write command) is received, the controller 110 and/or firmware of the memory device 100 identifies a particular wordline (or a wordline number) associated with the write command. The controller and/or firmware then determines whether the wordline is a boundary wordline (e.g., a first wordline or a last wordline) of the wordline zone with which that particular wordline is associated. If the wordline is a boundary wordline, the value associated with the wordline zone is programmed/stored in a non-data wordline.

When a UGSD event is detected, the controller 110 and/or firmware associated with the memory device 100 initiates a FLGP process. As part of this process, the controller 110 determines the value stored in the non-data wordline. The controller also compares the value in the non-data wordline to values in the wordline zone table. In an example, different values in the wordline zone table correspond to, or are associated with, different wordline zones. For example, a first value is associated with a first wordline zone, a second value is associated with a second wordline zone, etc.

When matching values are identified, the FLGP process is initiated on pages associated with the wordlines of the identified wordline zone. For example, the FLGP process is initiated on the wordline zone that is associated with the value that matches the value that was stored in the non-data wordline. In another example, the FLGP process is initiated on pages associated with a wordline zone associated with the next highest (or lowest) value (when compared with the value that was stored in the non-data wordline). For example, if the non-data wordline stored a value of 10, the FLGP process would be initiated in the wordline zone associated with a value of 11.

As previously explained, using these operations, the time it takes to complete the FLGP process is significantly reduced when compared with current solutions. For example, a FLGP process using a linear search typically requires up to X number of reads, where X is the number of wordlines of the memory block. Similarly, a FLGP process using a binary search typically requires up to log (X) number of reads. However, using the various techniques and operations described herein, the FLGP process may require a maximum number of log (X/Y) reads to find the last good page (where Y is the number of wordline zones).

Figure 2:
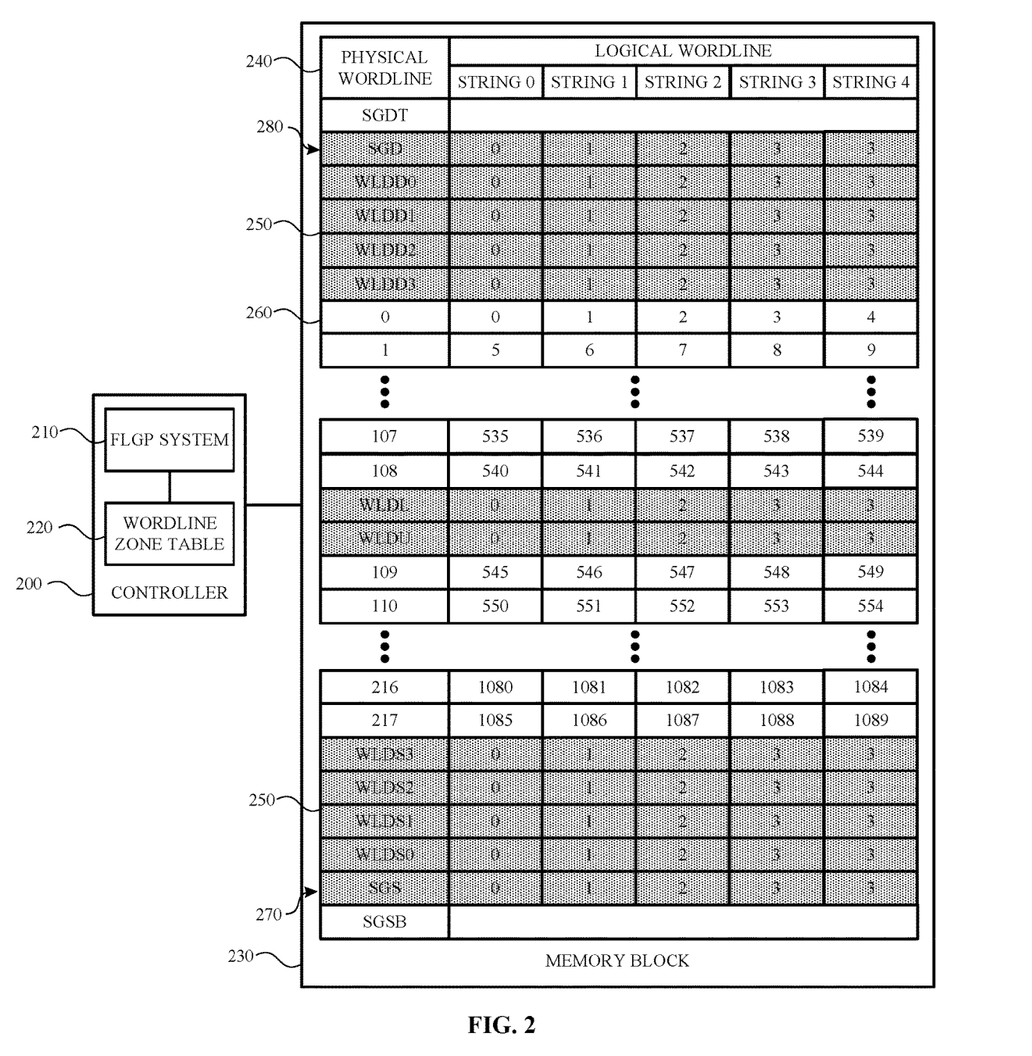
FIG. 2 illustrates a controller of a memory device having a find last good page system (FLGP) system and a wordline zone table according to an example.

FIG. 2 illustrates a controller 200 of a memory device having a find last good page system (FLGP) system 210 and a wordline zone table 220 according to an example. In an example, the controller 200 is similar to the controller 110 shown and described with respect to FIG. 1. In an example and although the FLGP system 210 and the wordline zone table 220 are shown as part of the controller 200, the FLGP system 210 and/or the wordline zone table 220 may be separate from the controller 200. For example, the FLGP system 210 and/or the wordline zone table 220 may be stored in, or be part of, firmware of a memory device (e.g., memory device 100 (FIG. 1)) and/or may be stored in one or more memory dies (e.g., memory die 120 (FIG. 1)) of the memory device.

In an example, the controller 200 is communicatively coupled to a memory die having one or more memory blocks 230. The memory block 230 includes or is otherwise associated with a number of wordlines 240 and each wordline is associated with a page. For example, the memory block 230 includes two-hundred eighteen data wordlines (shown as wordline 0-wordline 217). The memory block 230 also includes one or more non-data wordlines 250 and one or more select gates.

In an example, the memory block 230 includes a source side 270 and a drain side 280. The source side 270 includes a source select gate ("SGS") and a number of non-data (or dummy) wordlines. For example, the source size 270 of the memory block 230 includes non-data wordlines WLDS0, WLDS1, WLDS2 and WLDS3. Likewise, the drain side 280 of the memory block 230 includes a drain select gate ("SGD") and non-data wordlines WLDD0, WLDD1, WLDD2 and WLDD3. In an example, the memory block 230 also includes additional non-data wordlines. For example, the memory block 230 includes non-data wordlines WLDL and WLDU provided between Wordline 108 and Wordline 109.

In an example, the FLGP system 210 and/or the controller 200 identifies or determines the number of wordlines in the memory block 230. As previously indicated, in this example, the memory block 230 has two-hundred eighteen wordlines. When the number of wordlines of the memory block 230 has been identified, the controller 200 and/or the FLGP system 210 divides or sorts the wordlines into two or more wordline zones. In an example, the number of wordlines in each zone may vary. However, in an example, the wordlines in each zone are sequential.

For example, a first wordline zone includes Wordline 0-Wordline 26 and a second wordline zone includes Wordline 27-Wordline 54. Continuing with the example, a third wordline zone includes Wordline 55-Wordline 84 and a fourth wordline zone includes Wordline 85-Wordline 118.

When the wordline zones are determined/formed, the controller 200 and/or the FLGP system 210 associates a value with each wordline zone. In an example, the value associated with each wordline zone is a data mis-compare (DMC) value. In an example, the DMC value represents a number of bits that are in a particular state (e.g., an erase state) based, at least in part, on a particular read voltage level.

Figure 3:
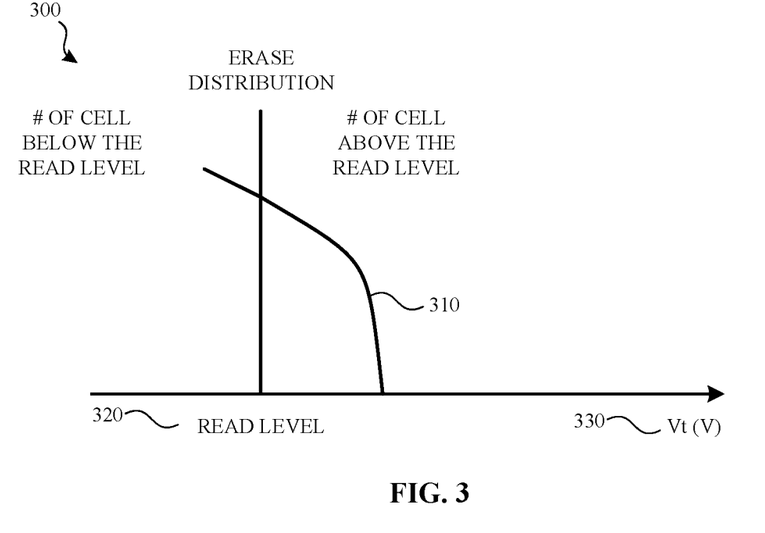
FIG. 3 illustrates a graph showing an erase distribution of memory cells when performing a data mis-compare read according to an example.

For example, when a DMC read (configured for counting zeros) is initiated or performed at a specified read level, the result of the DMC read provides a number of memory cells in the memory block 230 that are above that read level. For example and referring to FIG. 3, FIG. 3 illustrates a graph 300 showing an erase distribution of memory cells when performing a DMC read according to an example. In this example, the DMC read is configured to count the number of memory cells that have a zero (or an in an erased state), based on a read level 320. The resulting number is the DMC value and the DMC value is stored in a non-data wordline.

For example, the number of memory cells that are above the read level 320 is represented by the line 310 on the right side of the read level 320. Likewise, the number of memory cells that are below the read level 320 are represented by the line 310 on the left side of the read level 320. In an example, as the voltage level (e.g., Vt (V) 330) changes, so does the number of memory cells that are above/below the read level 320. As will be explained in greater detail below, when the wordlines of a memory block are divided into wordline zones, each wordline zone is associated with a DMC value and an associated program voltage threshold.

Referring back to FIG. 2, the wordline zone, the wordlines of the wordline zone, the DMC value and the associated program voltage threshold are stored in a wordline zone table 220. When the wordline zone table 220 has been created and stored, the wordline zone table 220 is useable by the FLGP system 210 and/or the controller 200 to identify the wordlines that were most recently programmed and also identify dirty blocks that are the result of a UGSD event.

Figure 4:
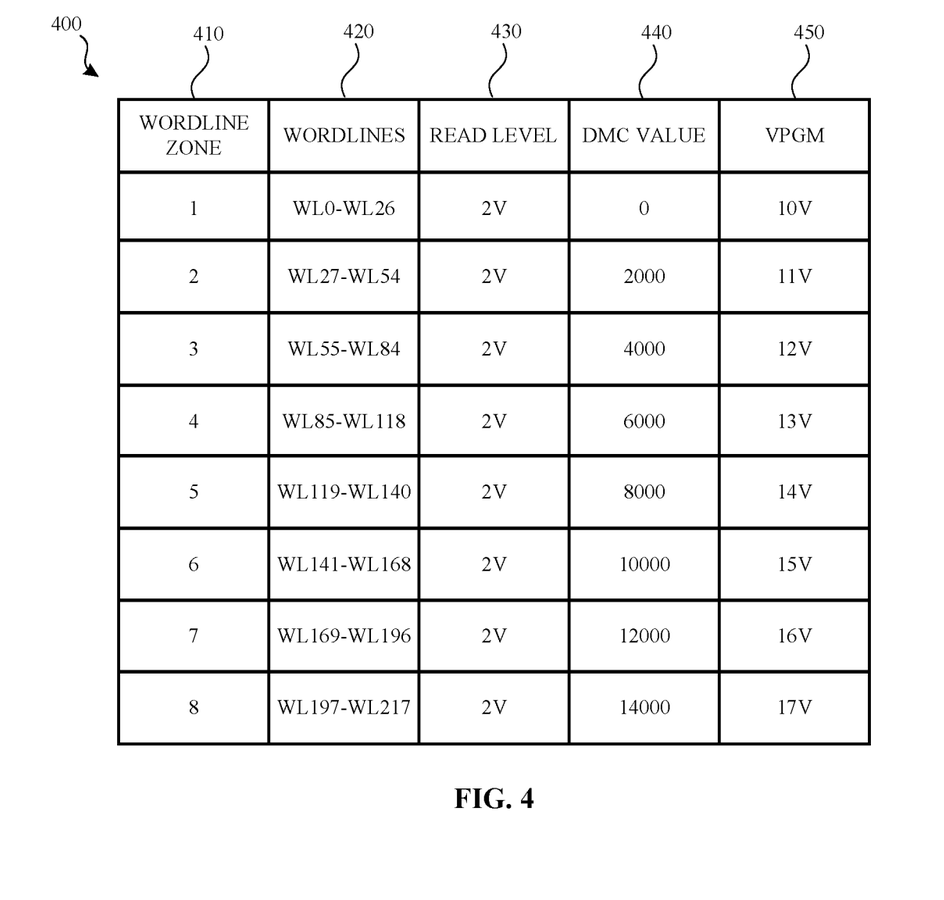
FIG. 4 illustrates a wordline zone table according to an example.

FIG. 4 illustrates a wordline zone table 400 according to an example. In an example, the wordline zone table 400 is similar to the wordline zone table 220 shown and described with respect to FIG. 2. In this example, the wordline zone table 400 includes eight wordline zones 410. Although eight wordline zones are shown and described, the wordline zone table 400 may have any number of wordline zones.

In an example, each wordline zone 410 includes an indication of the wordlines 420 in that wordline zone, a read level 430 or a read voltage required to read a DMC value from a non-data wordline, a DMC value 440 associated with the wordline zone 410 and a voltage programming level (VPGM) 450 associated with the wordline zone 410.

For example, Wordline Zone 1 includes Wordline 0-Wordline 26. In this example, the boundary wordlines of Wordline Zone 1 are Wordline 0 and/or Wordline 26. The wordline zone table 400 also shows that Wordline Zone 1 has a read level 430 of 2V, has a DMC value 440 of '0', and has a VPGM 450 of 10V. Likewise, Wordline Zone 2 includes Wordline 27-Wordline 56. The boundary wordlines of Wordline Zone 2 are Wordline 27 and Wordline 56. Additionally, Wordline Zone 2 has a read level 430 of 2V, has a DMC value 440 of '2000', and has a VPGM 450 of 11V. Although a specific number of wordline zones 410, wordlines 420, read levels 430, DMC values 440 and VPGMs 450 and shown and described, any values and/or numbers may be used.

Referring back to FIG. 2, when the wordline zone table 220 has been generated, a write command or a program operation is received by the controller 200. In response to receiving the write command, the controller 200 identifies a wordline (or a wordline number) associated with the write command. In an example, the controller 200 accesses the wordline zone table 220 to determine a wordline zone of the wordline and/or whether the wordline is a boundary wordline of the wordline zone (e.g., Wordline Zone 1).

For example and referring back to FIG. 4, if the wordline associated with the write command is Wordline 28, the controller 200 accesses the wordline zone table 400 to determine the wordline zone 410 associated with Wordline 28 and/or whether Wordline 28 is a boundary wordline. As shown in the wordline zone table 400, Wordline 28 is part of Wordline Zone 2, but is not a boundary wordline (Wordline 27 and Wordline 54 are boundary wordlines). Because Wordline 28 is not a boundary wordline, the controller continues executing the write command.

This process continues as more write commands are received and/or are executed. Eventually, a write command will be associated with Wordline 54. As shown in the wordline zone table 400, Wordline 54 is a boundary wordline of Wordline Zone 2. As such, when Wordline 54 is identified, the FLGP system 210 and/or the controller 200 accesses the wordline zone table 400, identifies the DMC value 440 (e.g., the DMC value 2000) associated with Wordline 54, and programs the DMC value 440 of 2000 in a non-data wordline (e.g., non-data wordline WLDS3). In an example, the DMC value 440 is associated with a particular VPGM 450 (e.g., 11V). This process continues until a UGSD event is detected.

When a UGSD event is detected, the controller 200 and/or the FLGP system 210 initiates a FLGP process. As part of this process, the FLGP system 210 determines the value stored in the non-data wordline (e.g., the non-data wordline WLDS3). The FLGP system 210 compares this value to the values (e.g., the DMC values 440) in the wordline zone table 220.

When a value in the wordline zone table 220 matches the value read from the non-data wordline, the FLGP system 210 determines that all of the wordlines in the wordline zone associated with the value have been completely programmed. As such, the FLGP system 210 applies the FLGP process on the wordlines of the next wordline zone.

Continuing with the previous example, if the FLGP system 210 determines that the value stored in the non-data wordline WLDS3 is 2000, the FLGP system 210 compares this value to the DMC values 440 in the wordline zone table 400. The FLGP system 210 determines that Wordline Zone 2 is associated with the same value. Because the DMC value 440 of Wordline Zone 2 matches the value stored in the non-data wordline WLDS3, the FLGP system 210 determines that all of the wordlines (or the pages associated with the wordlines) in Wordline Zone 2 were successfully programmed. As such, the FLGP system 210 applies the FLGP process on the wordlines (or the pages associated with the wordlines) of the next highest zone (e.g., the wordlines/pages associated with Wordline Zone 3).

In another example, the value stored in the non-data wordline indicates a wordline zone having wordlines that were not completely programmed. For example, and referring back to FIG. 4, if the wordline associated with the write command is Wordline 27, the controller 200 accesses the wordline zone table 400 and determines Wordline 27 is associated with Wordline Zone 2. The controller 200 also determines Wordline 27 is a boundary wordline. Because Wordline 27 is a boundary wordline, the FLGP system 210 and/or the controller 200 accesses the wordline zone table 400 and identifies the DMC value 440 (e.g., the DMC value 2000) associated with Wordline Zone 2. The DMC value 440 is programmed in a non-data wordline (e.g., non-data wordline WLDS3 or non-data wordline WLDD3).

When a UGSD event is detected, the controller 200 and/or the FLGP system 210 initiates a FLGP process. As part of this process, the FLGP system 210 determines the value stored in the non-data wordline (e.g., the non-data wordline WLDS3). The FLGP system 210 determines that the value stored in the non-data wordline WLDS3 is 2000.

The FLGP system 210 compares this value to the DMC values 440 in the wordline zone table 400 and determines that Wordline Zone 2 is associated with the same value. Because the DMC value 440 of Wordline Zone 2 matches the value stored in the non-data wordline WLDS3, the FLGP system 210 determines that not all of the wordlines (or not all of the pages associated with the wordlines) in Wordline Zone 2 were successfully programmed. As such, the FLGP system 210 applies the FLGP process on the wordlines/pages associated with Wordline Zone 2.

Figure 5:
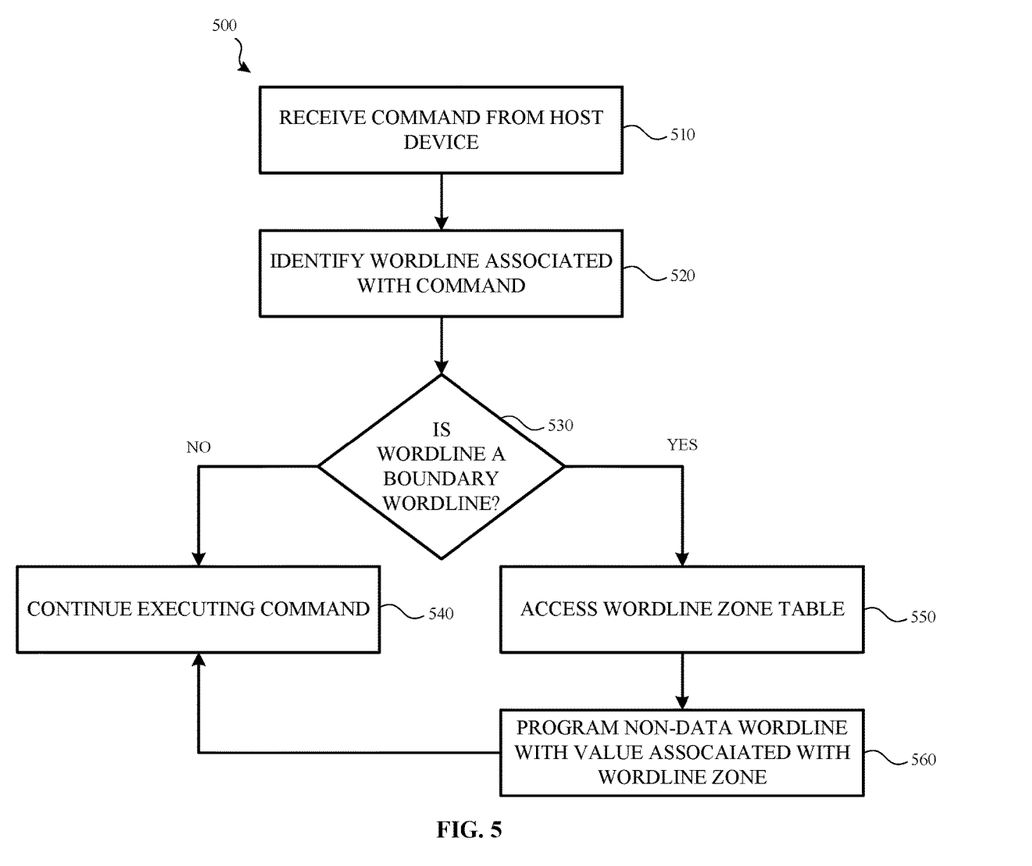
FIG. 5 illustrates a method for programming a non-data wordline with a value according to an example.

FIG. 5 illustrates a method 500 for programming a non-data wordline with a value according to an example. In an example, the method 500 is performed by a controller and/or a FLGP system associated with a memory device. For example, the method 500 is performed by a controller 200 and/or the FLGP system 210 shown and described with respect to FIG. 2.

The method 500 begins when a command is received (510) from a host device. In an example, the command is a write command and is received by the controller. When the command is received, the controller and/or the FLGP system associated with the controller identifies (520) a wordline associated with the received command. In an example, any suitable method for identifying the wordline associated with the command may be used.

The controller and/or the FLGP system then determines (530) whether the wordline associated with the command is a boundary wordline. In an example, this determination is made based, at least in part, on information provided in a wordline zone access table. For example, when the wordline is identified, the controller also identifies a wordline number associated with the wordline. The controller accesses the wordline zone table and determines, using the wordline number, a wordline zone associated with the wordline. The controller also determines whether the wordline is a boundary wordline (e.g., the first wordline of the wordline zone or the last wordline of the wordline zone) of the wordline zone.

If the controller determines (530) that the wordline is not a boundary wordline, the controller continues executing (540) the received command and the method 500 repeats. However, if the controller determines 530 that the wordline is a boundary wordline, the controller accesses (550) the wordline zone table and/or determines a value (e.g., a DMC value) associated with the wordline zone and/or the boundary wordline.

The value associated with the wordline zone and/or the boundary wordline is then programmed (560) in a non-data wordline. In an example, the controller continues executing (540) the received command and the method 500 is repeated.

Figure 6:
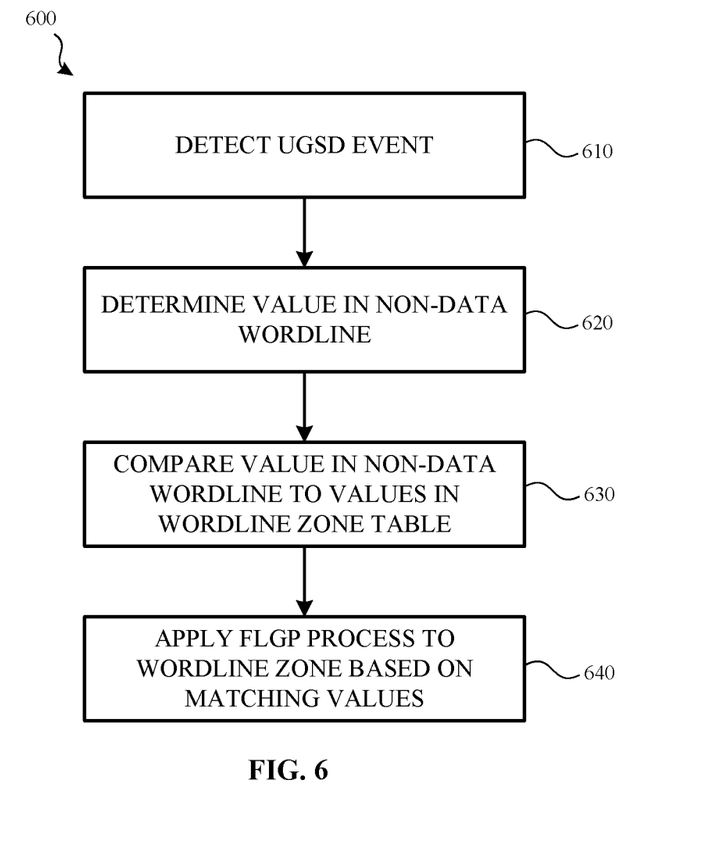
FIG. 6 illustrates a method for initiating a find last good page (FLGP) process according to an example.

FIG. 6 illustrates a method 600 for initiating a find last good page (FLGP) process according to an example. In an example, the method 600 is performed by a controller and/or a FLGP system associated with a memory device. For example, the method 600 is performed by a controller 200 and/or the FLGP system 210 shown and described with respect to FIG. 2.

In an example, method 600 begins when an ungraceful device shutdown (UGSD) event is detected (610). In an example, the UGSD event is detected as part of a reboot or power-on process of the memory device.

As part of the FLGP process, the controller and/or the FLGP system determines (620) a value in a non-data wordline. In an example, the non-data wordline that stores the value is identified by the FLGP system as having stored the value. In an example and as previously described, the value is a DMC value that is associated with a particular wordline zone.

The controller and/or the FLGP system compares (630) the value in the non-data wordline to values in a wordline zone table. In an example, the wordline zone table includes information regarding how wordlines of a memory block are divided into different zones. The wordline zone table also includes a value that is associated with each wordline zone.

When the controller and/or the FLGP system determines a value associated with a wordline zone matches the value stored in the non-data wordline, the controller applies (640) a FLGP process to the wordline zone (or to pages associated with the wordline zone) based on matching values. For example, when the data associated with the wordline zone matches the value in the non-data wordline, the FLGP process is started on the first wordline (or page) associated with that wordline zone. In another example, when the data associated with the wordline zone matches the value in the non-data wordline, the FLGP process is started on the first wordline (or page) associated with a wordline zone that is sequential to the wordline zone having the matching value.

In some examples, the determination as to which wordline zone the FLGP process will be applied is based, at least in part, on the number of wordline zones and/or on the wordline zone that is identified as having the matching value. For example, if the memory device includes eight wordline zones and the identified wordline zone is between Wordline Zone 1 and Wordline Zone 7, the FLGP process is started on the first wordline associated with the wordline zone that is sequential to the wordline zone having the matching value. However, if the identified wordline zone is Wordline Zone 8 (e.g., the last wordline zone), the FLGP process is started on the first wordline associated with Wordline Zone 8.

In an example, the non-data wordlines of the memory block, along with various DMC values may be used to store and/or identify other information about the memory device. For example, the non-data wordlines, and associated DMC values stored in the non-data wordlines, may be used to identify memory blocks (referred to herein as testing memory blocks) that underwent various tests during, for example, a die sorting phase of a memory die fabrication process.

For example, during the die sorting phase, the testing memory blocks were subjected multiple program/erase (P/E) cycles and other stresses. Due to the testing procedures, the testing memory blocks may need to be marked as bad memory blocks or are otherwise marked to not be used.

Typically, information about the testing memory blocks is stored in a userrom or other database associated with the memory device. However, in some implementations (e.g., in lower grade memory devices), the userrom is easily corrupted. As such, there is a risk that the testing memory blocks will be accessed and used.

To avoid this from happening, a controller (e.g., controller 100 (FIG. 1)) of a memory device (e.g., memory device 100) can associate a DMC value with one or more of the testing memory blocks. For example, one or more of the testing memory blocks is associated with a DMC value of 5000. In an example, the DMC value is stored in a non-data wordline.

To determine which memory blocks are testing memory blocks, the controller reads the value of the non-data wordline and compares the value to a memory block table that includes an association between a DMC value and the testing memory blocks. When the value of the non-data wordline is read and matched to the testing memory blocks, the controller can mark the testing memory blocks as bad memory blocks.

Figure 7:
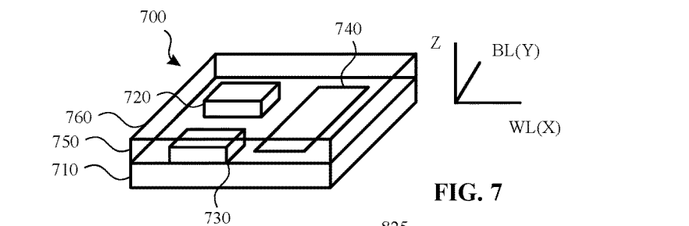
FIG. 7 is a perspective view of a storage device that includes three-dimensional (3D) stacked non-volatile memory according to an example.
Figure 8:
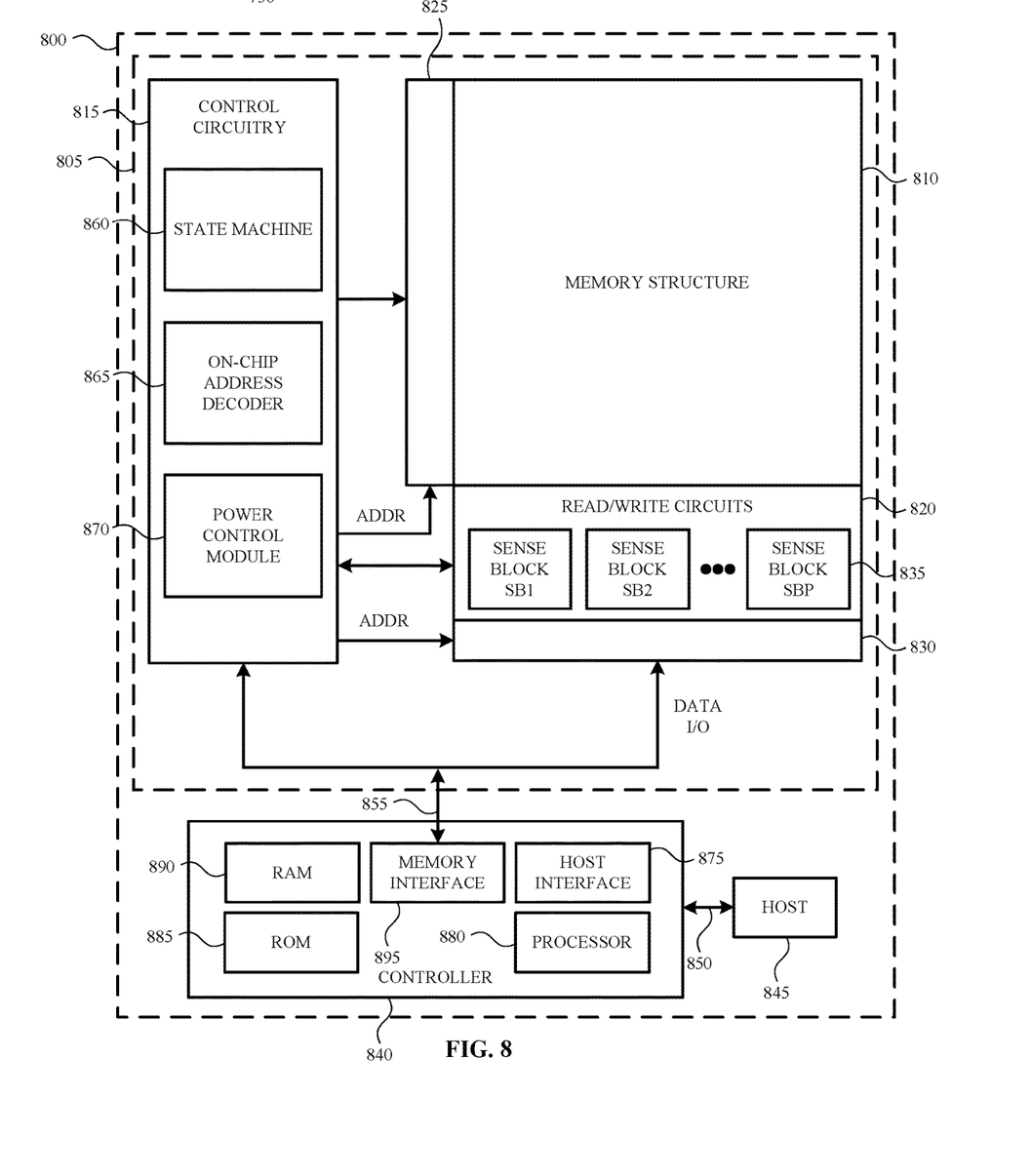
FIG. 8 is a block diagram of a data storage device according to an example.

FIG. 7-FIG. 8 describe example storage devices that may be used with or otherwise implement the various features described herein. For example, the storage devices shown and described with respect to FIG. 7-FIG. 8 may include various systems and components that are similar to the systems and components shown and described with respect to FIG. 1. For example, the controller 822 shown and described with respect to FIG. 8 may be similar to the controller 110 of FIG. 1. Likewise, the memory dies 808 may be similar to the memory dies 120 of FIG. 1.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks may include a first block 720 (BLK0) and a second block 730 (BLK1). Each block may be formed of memory cells (e.g., non-volatile memory elements). The substrate 710 may also include a peripheral area 740 having support circuits that are used by the first block 720 and the second block 730. The peripheral area 740 may be located beneath the first block 720 and the second block 730. In another example, the peripheral area may be included on a different substrate or die.

The substrate 710 may also carry circuits under the blocks, along with one or more lower metal layers which are patterned in conductive paths to carry signals from the circuits. The blocks may be formed in an intermediate region 750 of the storage device 700. The storage device may also include an upper region 760. The upper region 760 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 710 in the x-direction represents a direction in which signal paths for wordlines or control gate lines extend (e.g., a word line or drain select gate (SGD) line direction) and the width of the plane of the substrate 710 in the y-direction represents a direction in which signal paths for bit lines extend (e.g., a bit line direction). The z-direction represents a height of the storage device 700.

FIG. 8 is a functional block diagram of a storage device 800 according to an example. In an example, the storage device 800 may be the 3D stacked non-volatile storage device 700 shown and described with respect to FIG. 7. The components depicted in FIG. 8 may be electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by wordlines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805.

Commands and data may be transferred between a host 845 and the controller 840 using a data bus 850. Commands and data may also be transferred between the controller 840 and one or more of the memory dies 805 by way of lines 855. In one example, the memory die 805 includes a set of input and/or output (I/O) pins that connect to lines 855.

The memory structure 810 may also include one or more arrays of memory cells. The memory cells may be arranged in a three-dimensional array or a two-dimensional array. The memory structure 810 may include any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 may also include a state machine 860, an on-chip address decoder 865, and a power control module 870. The state machine 860 may provide chip-level control of various memory operations. The state machine 860 may be programmable by software. In another example, the state machine 860 does not use software and is completely implemented in hardware (e.g., electrical circuits).

The on-chip address decoder 865 may provide an address interface between addresses used by host 845 and/or the controller 840 to a hardware address used by the first decoder 825 and the second decoder 830.

The power control module 870 may control power and voltages that are supplied to the wordlines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815, the state machine 860, the on-chip address decoder 865, the first decoder 825, the second decoder 830, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 875, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more wordlines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die 805, using the memory interface 895. The host interface 875, in communication with the ROM 885, the RAM 895, and the one or more processors 880, may be an electrical circuit that provides an electrical interface between the controller 840 and the host 845. For example, the host interface 875 may change the format or timing of signals, provide a buffer, isolate from surges, latch I/O, and so on. Commands and data from the host 845 are received by the controller 840 by way of the host interface 875. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

Based on the above, examples of the present disclosure describe a method, comprising: dividing wordlines of a memory block of a memory device into a plurality of wordline zones, each wordline zone of the plurality of wordline zones being associated with a value; receiving a command from a host device; identifying a wordline associated with the command; determining whether the wordline associated with the command is a boundary wordline associated with a particular wordline zone; and based, at least in part, on determining the wordline is a boundary wordline associated with the particular wordline zone, storing the value associated with the particular wordline zone in a non-data wordline. In an example, the boundary wordline associated with the particular wordline zone is a last wordline within the particular wordline zone. In an example, the value associated with each wordline zone in the plurality of wordline zones is associated with a program voltage. In an example, the value associated with each wordline zone in the plurality of wordline zones is a data mis-compare value. In an example, the method also includes detecting an ungraceful device shutdown (UGDS) event; and initiating a find last good page (FLGP) process when power to the memory device is restored. In an example, the FLGP process includes: determining the value stored in the non-data wordline; identifying a wordline zone associated with the value; and applying the FLGP process on the wordline zone associated with the value. In an example, information associated with each wordline zone of the plurality of wordline zones, including the value associated with each wordline zone, is stored in a wordline zone table. In an example, the non-data wordline is associated with a source side of the memory block. In an example, the non-data wordline is associated with a drain side of the memory block.

Examples also describe a memory device, comprising: a controller; and a find last good page (FLGP) system associated with the controller, the FLGP system operable to: identify a wordline associated with a command received from a host device; determine whether the wordline associated with the command is in a particular position within a wordline zone, the wordline zone being associated with a value; and based, at least in part, on determining the wordline is in the particular position within the wordline zone, storing the value associated with the wordline zone in a non-data wordline. In an example, a particular position of the wordline within the wordline zone is a last wordline within the wordline zone. In an example, the value associated with the wordline zone is associated with a program voltage. In an example, the value associated with the wordline zone is a data mis-compare value. In an example, the FLGP system is further operable to: detect an ungraceful device shutdown (UGDS) event; and initiate a find last good page (FLGP) process when power to the memory device is restored. In an example, the FLGP process includes: determining the value stored in the non-data wordline; identifying a wordline zone associated with the value; and applying the FLGP process on the wordline zone associated with the value.

Additional examples describe a method, comprising: detecting an occurrence of an ungraceful device shutdown (UGDS) event; in response to detecting the occurrence of the UGDS event, initiating a find last good page (FLGP) process, the FLGP process comprising: determining a value stored in a non-data wordline associated with a memory block of a memory device, the memory block having a plurality of wordlines and each of the plurality of wordlines are associated with a wordline zone; identifying a particular wordline zone associated with the value; and applying the FLGP process on the wordline zone based, at least in part, on the value. In an example, the method also includes comparing the value stored in the non-data wordline with a corresponding value in a wordline zone table to identify the particular wordline zone associated with the value. In an example, the FLGP process is applied on the wordline zone associated with the value. In an example, the FLGP process is applied on a wordline zone that is sequential to the wordline zone associated with the value. In an example, the non-data wordline is identified as having stored the value.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   dividing wordlines of a memory block of a memory device into a plurality of wordline zones, each wordline zone of the plurality of wordline zones being associated with a value;
   receiving a command from a host device;
   identifying a wordline associated with the command;
   determining whether the wordline associated with the command is a boundary wordline associated with a particular wordline zone; and
   based, at least in part, on determining the wordline is a boundary wordline associated with the particular wordline zone, storing the value associated with the particular wordline zone in a non-data wordline.

2. The method of claim 1, wherein the boundary wordline associated with the particular wordline zone is a last wordline within the particular wordline zone.

3. The method of claim 1, wherein the value associated with each wordline zone in the plurality of wordline zones is associated with a program voltage.

4. The method of claim 1, wherein the value associated with each wordline zone in the plurality of wordline zones is a data mis-compare value.

5. The method of claim 1, further comprising:
 detecting an ungraceful device shutdown (UGDS) event; and
 initiating a find last good page (FLGP) process when power to the memory device is restored.

6. The method of claim 5, wherein the FLGP process includes:
 determining the value stored in the non-data wordline;
 identifying a wordline zone associated with the value; and
 applying the FLGP process on the wordline zone associated with the value.

7. The method of claim 1, wherein information associated with each wordline zone of the plurality of wordline zones, including the value associated with each wordline zone, is stored in a wordline zone table.

8. The method of claim 1, wherein the non-data wordline is associated with a source side of the memory block.

9. The method of claim 1, wherein the non-data wordline is associated with a drain side of the memory block.

10. A memory device, comprising:
 a controller; and
 a find last good page (FLGP) system associated with the controller, the FLGP system operable to:
  identify a wordline associated with a command received from a host device;
 determine whether the wordline associated with the command is in a particular position within a wordline zone, the wordline zone being associated with a value; and
 based, at least in part, on determining the wordline is in the particular position within the wordline zone, storing the value associated with the wordline zone in a non-data wordline.

11. The memory device of claim 10, wherein the particular position of the wordline within the wordline zone is a last wordline within the wordline zone.

12. The memory device of claim 10, wherein the value associated with the wordline zone is associated with a program voltage.

13. The memory device of claim 10, wherein the value associated with the wordline zone is a data mis-compare value.

14. The memory device of claim 10, wherein the FLGP system is further operable to:
 detect an ungraceful device shutdown (UGDS) event; and
 initiate a find last good page (FLGP) process when power to the memory device is restored.

15. The memory device of claim 14, wherein the FLGP process includes:
 determining the value stored in the non-data wordline;
 identifying a wordline zone associated with the value; and
 applying the FLGP process on the wordline zone associated with the value.

16. A memory device, comprising:
 means for identifying a wordline associated with a command received from a host device;
 means for determining whether the wordline associated with the command is in a particular position within a wordline zone, the wordline zone being associated with a value; and
 means for storing the value associated with the wordline zone in a non-data wordline.

17. The memory device of claim 16, wherein the particular position of the wordline within the wordline zone is a boundary wordline within the wordline zone.

18. The memory device of claim 16, wherein the value associated with the wordline zone is associated with a program voltage.

19. The memory device of claim 10, further comprising:
 means for detecting an ungraceful device shutdown (UGDS) event; and
 means for initiating a find last good page (FLGP) process when power to the memory device is restored.

20. The memory device of claim 19, wherein the means for initiating the FLGP process further comprises:
 means for determining the value stored in the non-data wordline;
 means for identifying a wordline zone associated with the value; and
 means for applying the FLGP process on the wordline zone associated with the value.

* * * * *